(12) United States Patent
Simon

(10) Patent No.: US 8,857,171 B2
(45) Date of Patent: Oct. 14, 2014

(54) INTEGRATED HYDROSTATIC TRANSMISSION

(75) Inventor: Matthew Herman Simon, Paw Paw, MI (US)

(73) Assignee: Parker-Hannifin Corporation, Cleveland, OH (US)

( * ) Notice: Subject to any disclaimer, the term of this patent is extended or adjusted under 35 U.S.C. 154(b) by 915 days.

(21) Appl. No.: 13/025,936

(22) Filed: Feb. 11, 2011

(65) Prior Publication Data

US 2011/0192158 A1 Aug. 11, 2011

Related U.S. Application Data

(60) Provisional application No. 61/303,441, filed on Feb. 11, 2010, provisional application No. 61/406,908, filed on Oct. 26, 2010, provisional application No. 61/407,784, filed on Oct. 28, 2010.

(51) Int. Cl.
*F16D 31/02* (2006.01)
*F16H 39/14* (2006.01)
(52) U.S. Cl.
CPC ..................................... *F16H 39/14* (2013.01)
USPC .............................................. 60/487; 60/454
(58) Field of Classification Search
CPC ............ F15B 7/006; F15B 7/008; F15B 7/02; F16H 39/04; F16H 39/14
USPC ............. 92/12.2; 60/454, 458, 464, 484, 485, 60/487, 488; 180/305–308; 417/375, 405
See application file for complete search history.

(56) References Cited

U.S. PATENT DOCUMENTS

| | | | |
|---|---|---|---|
| 1,817,063 A * | 8/1931 | Carrie et al. ..................... | 91/485 |
| 2,495,685 A | 1/1950 | Beaman et al. | |
| 2,834,297 A | 5/1959 | Postel et al. | |
| 2,936,589 A | 5/1960 | Quintilian | |
| 2,988,007 A | 6/1961 | Quintilian | |
| 3,094,456 A | 5/1963 | Bienke | |
| 3,171,256 A * | 3/1965 | Lauck ............................. | 60/452 |
| 3,177,665 A | 4/1965 | Power | |
| 3,209,538 A * | 10/1965 | Yoshikazu ....................... | 60/444 |

(Continued)

FOREIGN PATENT DOCUMENTS

| | | |
|---|---|---|
| GB | 2 062 187 | 5/1981 |
| JP | 01300073 | 12/1989 |
| JP | 2001220770 | 8/2001 |

OTHER PUBLICATIONS

Eaton Transmission Package, T1515Y-21 Design, Vickers® Transmissions Service Date, Mar. 1, 1980, 4 pages.

(Continued)

*Primary Examiner* — Michael Leslie
(74) *Attorney, Agent, or Firm* — Renner, Otto, Boisselle & Sklar LLP

(57) ABSTRACT

An integrated hydrostatic transmission including a reservoir housing having at least two openings, wherein a pre-assembled motor module can be received in one of the openings for closing the opening, and a cover can be attached to the other opening for closing the opening. As a result, the motor can be mounted at a left or right side opening depending on which side of a zero-turn-radius mower or other vehicle the transmission is being mounted, and because the transmission is modular, the design provides for ease of service of both the hydraulic motor and a hydraulic pump.

23 Claims, 15 Drawing Sheets

(56) References Cited

U.S. PATENT DOCUMENTS

| | | | |
|---|---|---|---|
| 3,293,848 A * | 12/1966 | Yoshikazu | 60/427 |
| 3,493,067 A | 2/1970 | Rumsey | |
| 3,521,449 A * | 7/1970 | Speggiorin | 60/488 |
| 3,643,434 A | 2/1972 | Widmaier | |
| 3,751,924 A * | 8/1973 | Brown et al. | 60/485 |
| 3,890,783 A | 6/1975 | Allen et al. | |
| 3,949,824 A | 4/1976 | Bennett | |
| 4,064,766 A | 12/1977 | Rinaldo | |
| 4,070,219 A | 1/1978 | Farnam | |
| 4,071,106 A | 1/1978 | Junck et al. | |
| 4,105,369 A | 8/1978 | McClocklin | |
| 4,171,559 A | 10/1979 | Vyse et al. | |
| 4,285,643 A | 8/1981 | White | |
| 4,373,600 A | 2/1983 | Buschbom et al. | |
| 4,580,646 A | 4/1986 | Tokunaga | |
| 4,616,478 A | 10/1986 | Jensen | |
| 4,627,237 A | 12/1986 | Hutson | |
| 4,666,091 A | 5/1987 | von der Heide | |
| 4,843,817 A | 7/1989 | Shivvers et al. | |
| 4,845,949 A | 7/1989 | Shivvers et al. | |
| 4,870,820 A | 10/1989 | Nemoto | |
| 4,903,792 A | 2/1990 | Ze-ying | |
| 4,932,209 A | 6/1990 | Okada et al. | |
| 4,936,095 A | 6/1990 | Ross et al. | |
| 5,018,351 A | 5/1991 | Otte | |
| 5,146,748 A | 9/1992 | Okada | |
| 5,181,837 A | 1/1993 | Niemiec | |
| 5,203,169 A | 4/1993 | Ishii et al. | |
| 5,205,123 A | 4/1993 | Dunstan | |
| 5,211,077 A | 5/1993 | Louis et al. | |
| 5,218,886 A | 6/1993 | Louis et al. | |
| 5,317,936 A | 6/1994 | Shiba et al. | |
| 5,354,180 A * | 10/1994 | Forster | 417/199.1 |
| 5,356,347 A | 10/1994 | Komura et al. | |
| 5,363,740 A | 11/1994 | Coakley | |
| 5,373,697 A | 12/1994 | Joliff et al. | |
| 5,394,699 A | 3/1995 | Matsufuji | |
| 5,412,947 A * | 5/1995 | Hirose | 60/454 |
| 5,447,028 A | 9/1995 | Azuma et al. | |
| 5,473,964 A | 12/1995 | Okada et al. | |
| 5,497,623 A | 3/1996 | Hauser et al. | |
| 5,540,563 A | 7/1996 | Hansell | |
| 5,557,931 A | 9/1996 | Hauser et al. | |
| 5,613,409 A | 3/1997 | Hauser | |
| 5,622,051 A | 4/1997 | Iida et al. | |
| 5,701,739 A * | 12/1997 | Ohashi et al. | 60/453 |
| 5,910,060 A | 6/1999 | Blume | |
| 5,918,691 A | 7/1999 | Ishill | |
| 5,921,151 A | 7/1999 | Louis et al. | |
| 5,950,500 A | 9/1999 | Okada et al. | |
| 5,979,270 A | 11/1999 | Thoma et al. | |
| 6,010,423 A | 1/2000 | Joliff et al. | |
| 6,030,182 A | 2/2000 | Voigt | |
| 6,073,443 A | 6/2000 | Okada et al. | |
| RE36,807 E | 8/2000 | Okada | |
| 6,139,737 A * | 10/2000 | Gizowski | 210/223 |
| 6,152,247 A | 11/2000 | Sporrer et al. | |
| 6,167,619 B1 | 1/2001 | Beagle | |
| 6,176,086 B1 | 1/2001 | Betz | |
| 6,209,928 B1 | 4/2001 | Benett et al. | |
| 6,220,377 B1 | 4/2001 | Lansberry | |
| 6,233,929 B1 | 5/2001 | Okada et al. | |
| 6,237,332 B1 | 5/2001 | Thoma et al. | |
| 6,276,840 B1 | 8/2001 | Weiss et al. | |
| 6,343,471 B1 | 2/2002 | Thoma et al. | |
| 6,425,244 B1 | 7/2002 | Ohashi et al. | |
| 6,427,442 B2 | 8/2002 | Thoma et al. | |
| 6,427,443 B2 | 8/2002 | Smothers et al. | |
| 6,481,203 B1 | 11/2002 | Johnson et al. | |
| 6,487,856 B1 | 12/2002 | Ohashi et al. | |
| 6,487,857 B1 | 12/2002 | Poplawski et al. | |
| 6,508,059 B1 | 1/2003 | Takada et al. | |
| 6,550,243 B2 | 4/2003 | Hauser et al. | |
| 6,554,084 B1 | 4/2003 | Enmeiji | |
| 6,564,550 B2 | 5/2003 | Thoma et al. | |
| 6,592,290 B2 | 7/2003 | Jaszkowiak | |
| 6,592,336 B1 | 7/2003 | Hirano et al. | |
| 6,598,694 B2 | 7/2003 | Forster | |
| 6,643,959 B2 | 11/2003 | Joliff et al. | |
| 6,651,529 B1 | 11/2003 | Poplawski et al. | |
| 6,672,057 B1 | 1/2004 | Hauser et al. | |
| 6,672,058 B1 | 1/2004 | Langenfeld et al. | |
| 6,672,843 B1 | 1/2004 | Holder et al. | |
| 6,675,696 B1 | 1/2004 | Langenfeld | |
| 6,688,417 B2 | 2/2004 | Hansell | |
| 6,691,512 B1 | 2/2004 | Kopel et al. | |
| 6,694,729 B1 | 2/2004 | Trimble | |
| 6,715,284 B1 | 4/2004 | Poplawski et al. | |
| 6,736,605 B2 | 5/2004 | Ohashi et al. | |
| 6,782,797 B1 | 8/2004 | Brandenburg et al. | |
| 6,799,346 B2 | 10/2004 | Jeng et al. | |
| 6,804,958 B1 | 10/2004 | Poplawski et al. | |
| 6,817,960 B2 | 11/2004 | Joliff et al. | |
| 6,843,056 B1 | 1/2005 | Langenfeld et al. | |
| 6,953,327 B1 | 10/2005 | Hauser et al. | |
| 6,955,046 B1 | 10/2005 | Holder et al. | |
| 6,973,783 B1 | 12/2005 | Hauser et al. | |
| 6,988,580 B2 | 1/2006 | Ohashi et al. | |
| 7,036,311 B2 | 5/2006 | Hauser et al. | |
| 7,056,101 B1 | 6/2006 | Hauser et al. | |
| 7,082,759 B1 | 8/2006 | Tsukamoto et al. | |
| 7,137,250 B1 | 11/2006 | McCoy et al. | |
| 7,308,790 B1 | 12/2007 | Bennett et al. | |
| 7,309,301 B2 | 12/2007 | Janson et al. | |
| 7,316,287 B2 | 1/2008 | Ohashi et al. | |
| 7,370,714 B2 | 5/2008 | Yasuda et al. | |
| 7,392,654 B1 | 7/2008 | Hauser et al. | |
| 7,448,209 B2 * | 11/2008 | Abend et al. | 60/484 |
| 7,455,132 B2 | 11/2008 | Acharya et al. | |
| 7,455,144 B2 | 11/2008 | Ohashi et al. | |
| 7,523,611 B2 | 4/2009 | Dong et al. | |
| 7,536,858 B2 | 5/2009 | Abend et al. | |
| 7,647,769 B2 * | 1/2010 | White, Jr. | 60/485 |
| 8,028,776 B2 * | 10/2011 | Dong et al. | 180/6.48 |
| 2002/0179340 A1 | 12/2002 | Jolliff et al. | |
| 2003/0070429 A1 | 4/2003 | Jolliff et al. | |
| 2003/0116936 A1 | 6/2003 | Felsing et al. | |
| 2006/0039801 A1 * | 2/2006 | Dong et al. | 417/269 |
| 2007/0017712 A1 | 1/2007 | Dunn | |
| 2008/0120974 A1 | 5/2008 | Dong et al. | |
| 2008/0310972 A1 | 12/2008 | Dong et al. | |

OTHER PUBLICATIONS

Eaton® Hydrostatic Transaxles, Models 751, 851, 771, and 781 Hydrostatic Transaxles, We Manufacture Solutions, 11-04-888, EN-0101 (Replaces 11-888) 20 pages.
Office Action for U.S. Appl. No. 11/467,375 dated Jun. 24, 2008.
Notice of Allowance for U.S. Appl. No. 11/467,375 dated Dec. 19, 2008.
Office Action for U.S. Appl. No. 11/536,358 dated Aug. 6, 2008.
Office Action for U.S. Appl. No. 11/536,358 dated Mar. 24, 2009.
Notice of Allowance for U.S. Appl. No. 11/536,358 dated Aug. 3, 2009.
Supplemental Notice of Allowance for U.S. Appl. No. 11/536,358 dated Aug. 21, 2009.
Office Action for U.S. Appl. No. 11/551,524 dated Jul. 22, 2008.
Notice of Allowance for U.S. Appl. No. 11/551,524 dated Dec. 9, 2009.
Office Action for U.S. Appl. No. 11/563,122 dated Mar. 31, 2009.
Office Action for U.S. Appl. No. 11/761,651 dated Apr. 13, 2009.
Brochure; "TRW Ross Gear Torqdrive Axle"; Sep. 2003.
Brochure; "The Latest from Hydro-Gear"; date unknown.

* cited by examiner

INTEGRATED HYDROSTATIC TRANSMISSION

RELATED APPLICATIONS

This application claims the benefit of U.S. Provisional Application No. 61/303,441 filed Feb. 11, 2010, U.S. Provisional Application No. 61/406,908 filed Oct. 26, 2010 and U.S. Provisional Application No. 61/407,784 filed Oct. 28, 2010, all of which are incorporated herein by reference in their entireties.

FIELD OF THE INVENTION

The present invention relates generally to hydrostatic transmissions, and more particularly to hydrostatic transmissions for use in vehicles, such as mowing machines.

BACKGROUND

Hydrostatic transmissions have many uses, including the propelling of vehicles, such as mowing machines. A typical hydrostatic transmission system includes a variable displacement hydraulic pump connected in a closed hydraulic circuit with a fixed or variable displacement hydraulic motor. The closed hydraulic circuit includes a first conduit connecting the main pump outlet with the motor inlet and a second conduit connecting the motor outlet with a pump inlet. Either of these conduits may be the high pressure line depending upon the direction of pump displacement from neutral. For most applications, the pump is driven by a prime mover, such as an internal combustion engine or an electrical motor, at a certain speed in a certain direction. Changing the displacement of the main pump will change its output flow rate, which controls the speed of the motor. Pump outflow can be reversed, thus reversing the direction of the motor. In a vehicle, the motor is often connected through suitable gearing to the vehicle's wheels or tracks.

In some vehicles, such as zero-turn-radius mowers, separate hydraulic pumps and motors are used to independently drive separate wheels of an axle. By independently driving the wheels in opposite directions, for example, the vehicle can be made to turn with zero radius. Zero-turn-radius mowers are increasingly popular as the size and costs of such mowers decrease. As the size of such mowers decreases, however, the space available for the hydraulic components and/or the prime mover also decreases.

SUMMARY OF INVENTION

The present invention provides an integrated hydrostatic transmission including a reservoir housing having at least two openings, wherein a pre-assembled motor module can be received in one of the openings for closing the opening, and a cover can be attached to the other opening for closing the opening. As a result, the motor can be mounted at a left or right side opening depending on which side of a zero-turn-radius mower or other vehicle the transmission is being mounted, and because the transmission is modular, the design provides for ease of service of both the hydraulic motor and a hydraulic pump module.

In particular, the integrated hydrostatic transmission includes a hydraulic pump module, a hydraulic motor including an end port plate having inlet and outlet passages, and a reservoir housing. The reservoir housing has a chamber forming a fluid reservoir, and the reservoir housing includes in opposing walls at least two openings. The motor can be received in one of the openings for closing the opening, and a cover can be attached to the other opening for closing the opening.

According to another aspect of the invention, an integrated hydrostatic transmission includes a reservoir housing having in a side wall at least one opening, and a pre-assembled hydraulic motor module inserted in the opening for closing the opening, preferably at a radially outer surface of an end port plate included in the motor module.

More particularly, the integrated hydrostatic transmission includes a hydraulic pump module, a pre-assembled hydraulic motor module including an end port plate having inlet and outlet passages, and a reservoir housing having a chamber for receiving the hydraulic pump module and forming a fluid reservoir, the reservoir housing having in a side wall at least one opening, wherein the pre-assembled motor module is inserted in the at least one opening for closing the opening.

According to a further aspect of the invention, an integrated hydrostatic transmission includes a reservoir housing forming interiorly thereof a reservoir chamber for containing hydraulic fluid and a wall including at least one opening communicating interiorly with the reservoir chamber, a hydraulic motor extending through the opening and closing the opening, and having an end port plate, and a center block mounted to the housing and having a motor mount surface located in the reservoir chamber and configured to couple to the end port plate of the motor.

More particularly, the integrated hydrostatic transmission includes a hydraulic pump module, a reservoir housing forming interiorly thereof a reservoir chamber for containing hydraulic fluid and a wall including at least one opening communicating interiorly with the reservoir chamber, a hydraulic motor module extending through the opening and closing the opening and having an end port plate having inlet and outlet passages, and a center block mounted to the housing. The center block having a motor mount surface located in the reservoir chamber and configured to couple to the end port plate of the motor module and a pump mount surface located in the reservoir chamber having at least one port for communicating with the pump module.

According to yet another aspect of the invention, a method of assembling an integrated hydrostatic transmission comprises mounting a pre-assembled hydraulic pump module to the underside of a top housing member that forms with a bottom housing member a reservoir housing having opposed side walls with respective first and second openings therethrough, mounting a center block with respect to the hydraulic pump module so that a pump mount surface on the center block is adjacent a bottom of the pump module for communicating inlet/outlet ports of the pump module to respective flow passages in the center block, inserting a pre-assembled motor module into one of the first or second openings, mounting the center block to the motor module at a motor mount surface of the center block for communicating outlet/inlet ports of the motor module with respective flow passages in the center block, and closing the other of the first or second openings in the reservoir housing.

The foregoing and other features of the invention are hereinafter described in greater detail with reference to the accompanying drawings.

DETAILED DESCRIPTION

Figure 1:
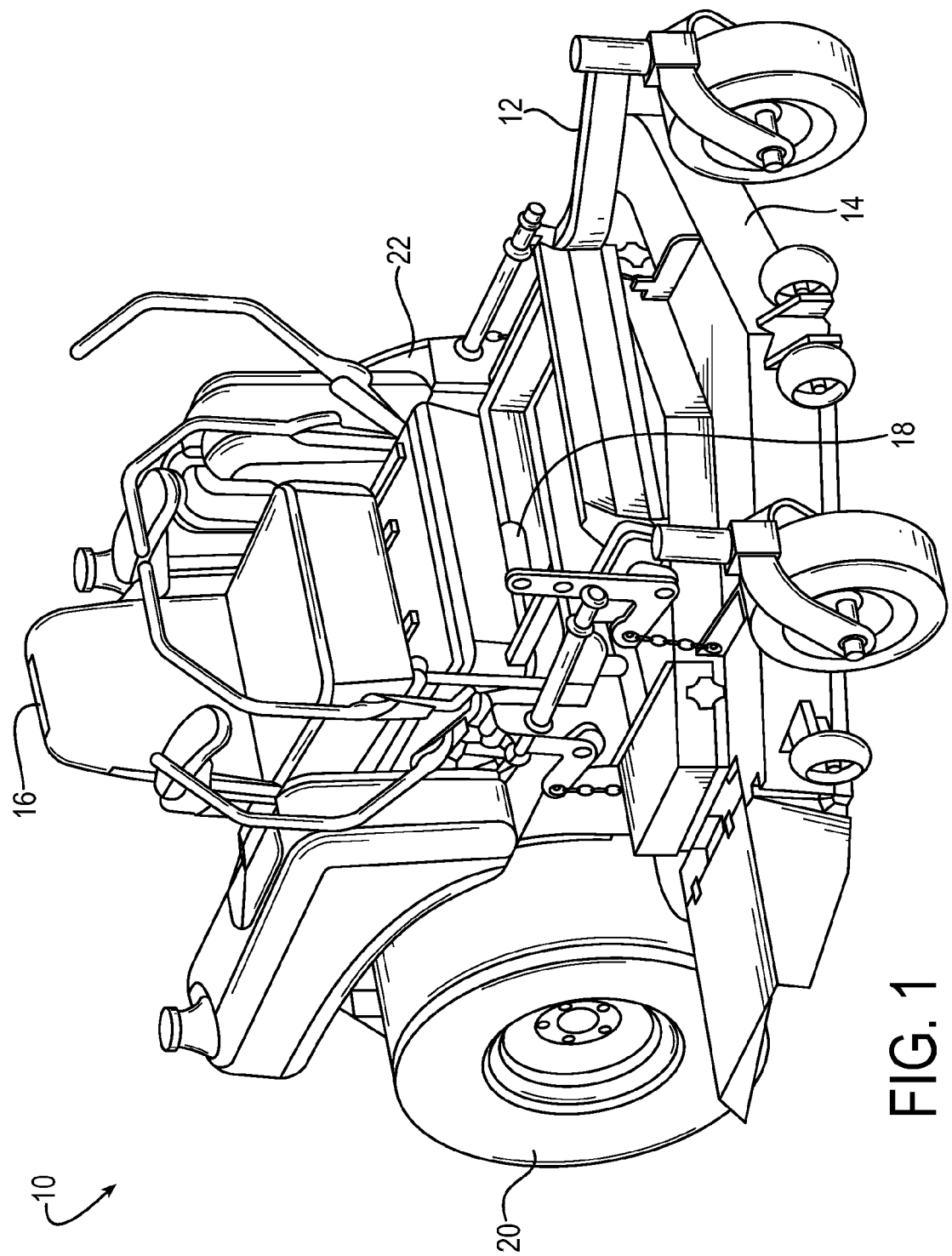
FIG. 1 is a perspective view of an exemplary zero-turn-radius mower employing a hydrostatic transmission to which the principles of the invention can be applied, as discussed below.

Referring now to the drawings in detail, and initially to FIG. 1, an exemplary zero-turn-radius mower 10 is illustrated. The mower 10 includes a frame 12, a mower deck 14 supported by the frame 12 for mowing grass, an operator seat 16, and a plurality of controls 18 for operating the mower 10. A rear mounted engine mounted to the frame 12 behind the seat 16 provides power to left and right hydrostatic transmissions (the engine and hydrostatic transmissions are not shown in FIG. 1) also mounted to the frame 12. The hydrostatic transmissions can be controlled by an operator to independently drive respective rear wheels 20 to propel the mower and provide zero-turn-radius functionality. The design of the illustrated mower 10 is merely exemplary in nature, and it will be appreciated that other mower designs and vehicle types can be used in accordance with the invention.

Figure 2:
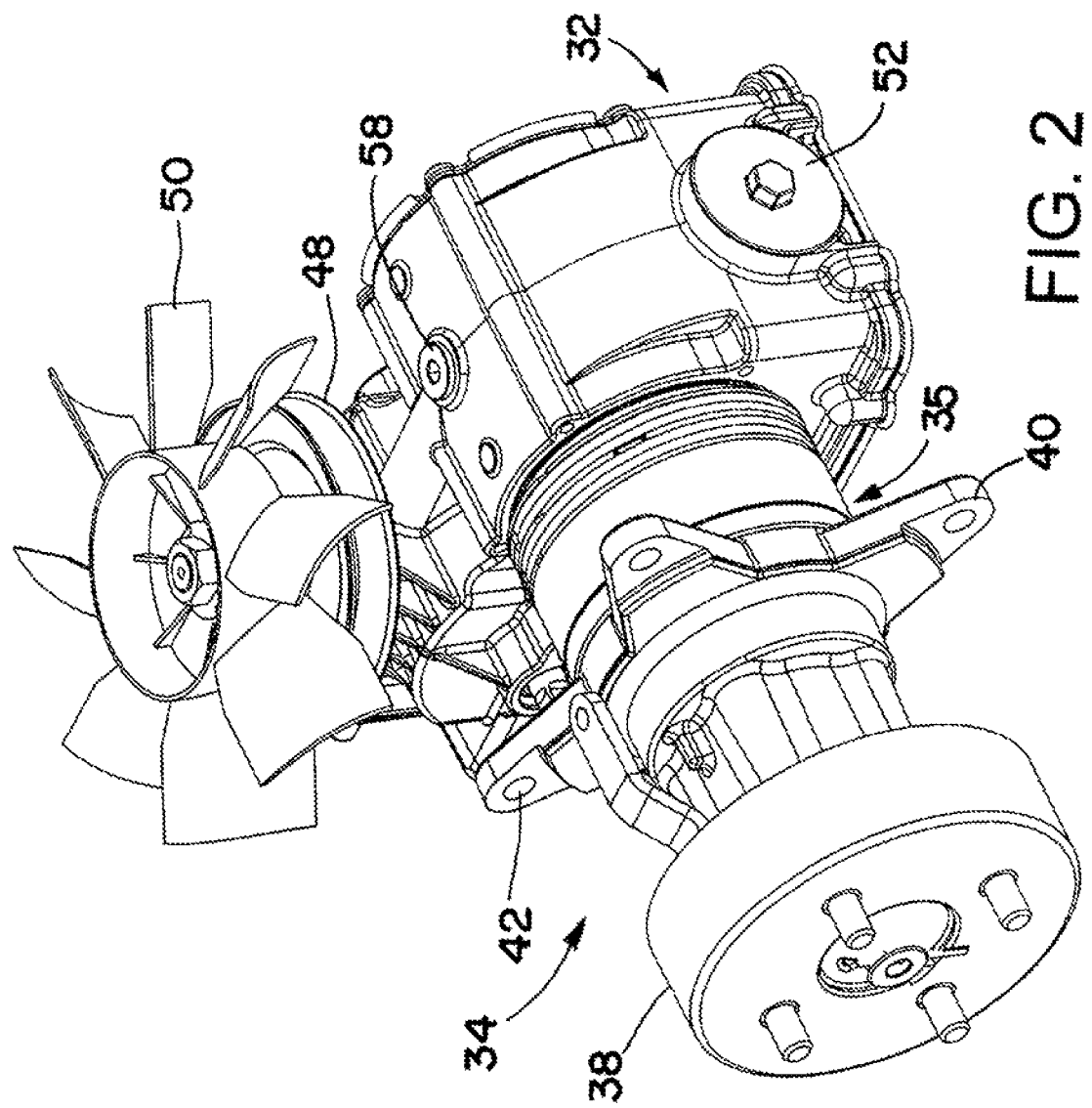
FIG. 2 is a perspective view of a hydrostatic transmission in accordance with the invention.
Figure 3:
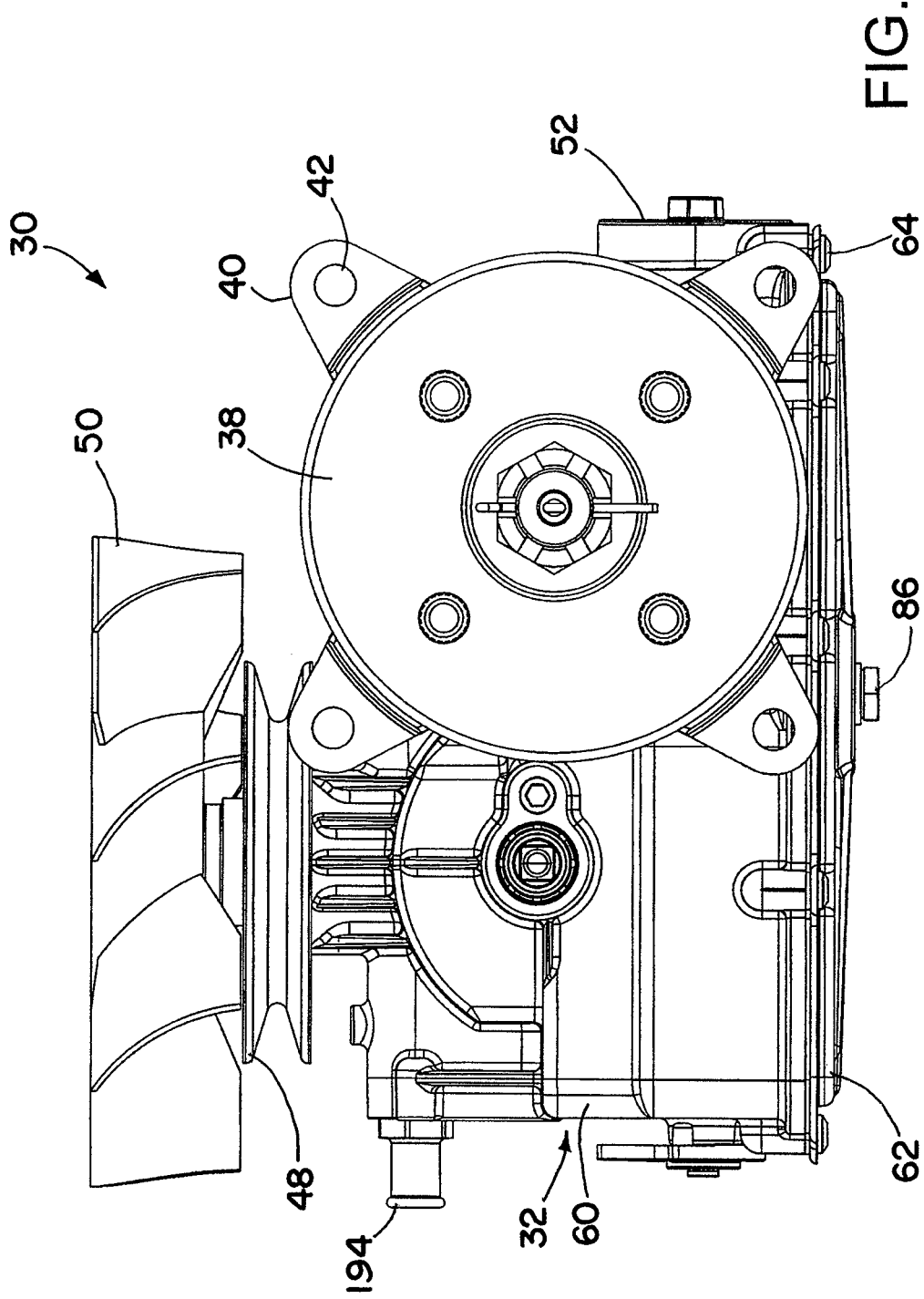
FIG. 3 is a side view of the hydrostatic transmission of FIG. 2.

FIGS. 2 and 3 illustrate an exemplary transmission 30 showing a left-handed mounted motor assembly that can be used for driving a wheel 20. As shown, the transmission 30 generally comprises a reservoir housing 32 having an opening that communicates with a reservoir and extends through a side wall of the housing from the reservoir to an exterior of the housing, and that is closed by a hydraulic motor module 34 in a manner described further below. The motor module 34 includes a motor 35 having an output shaft 36 (FIG. 6) that can serve as an axle shaft for wheel hub 38. The motor module 34 is provided with attachment lugs 40 having through holes 42 for receiving fasteners for mounting the motor module 34, and more particularly the entire transmission 30, to the mower 10. Therefore, external loads on a hydraulic pump module 44, such as from a pulley or trunnion shaft, are reacted through the fasteners connecting the motor module to the mower.

The hydraulic pump module 44, which is described further below, is housed in a cavity of the reservoir housing 32, and has an input shaft 46 (FIGS. 5 and 6) projecting from the reservoir housing 32 to which an input wheel 48 and a cooling fan 50 may be attached. The input wheel 48, as shown, may be a pulley about which a drive belt can be trained as is customary for driving a pump off of an engine. Alternatively, other types of drive wheels may be employed, such as for example, a sprocket for use with a chain drive. It is noted, however, that pulley drives are more customary in the zero-turn-radius art.

The reservoir housing 32 may be formed unitary or formed by multiple housing parts arranged in any suitable manner, and may have a length that is over twice as long as its width, for example. The housing 32 has threaded therein, or otherwise suitably attached, a filter cap 52 for closing an opening in an end wall of the housing 32 through which a filter 54 (FIG. 18) can be installed, as discussed further below. The housing can have one or more cooling fins for dissipation of heat. Further, the housing can include a fill port closed by a plug 58, where the plug 58 can be removed to allow for filling of a fluid reservoir with hydraulic fluid. The fluid reservoir is formed in the cavity, which preferably is sized to provide adequate heat dissipation, in combination with the cooling fan 50, such that the transmission 30 is self contained and therefore does not require an additional reservoir or means of cooling, such as a heat exchanger.

Figure 4:
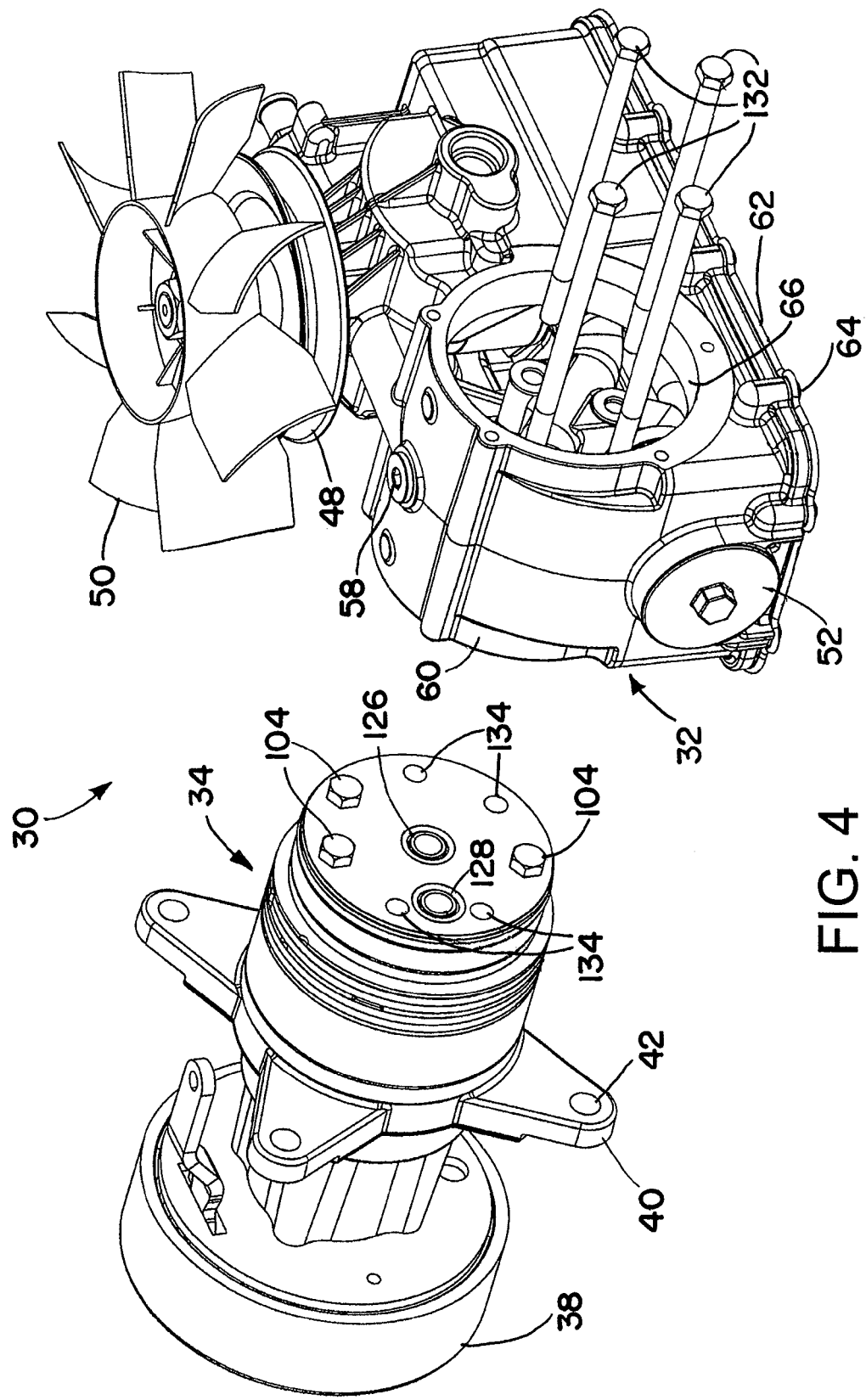
FIG. 4 is an exploded perspective view of the hydrostatic transmission of FIG. 2, showing the hydraulic motor module thereof withdrawn from a reservoir housing.

As shown in FIG. 4, the reservoir housing 32 includes a top housing member 60 and a bottom housing member 62, in particular a bottom cover. The top housing member 60 defines the cavity, and the bottom cover 62 may be coupled to the top housing member 60 by fasteners 64 to close the cavity. The top housing member 60 and bottom cover 62 can be made of any suitable material, such as metal and formed by stamping, forging, casting, machining, etc., and a gasket may be used to seal between the top housing member and the bottom cover.

Figure 11:
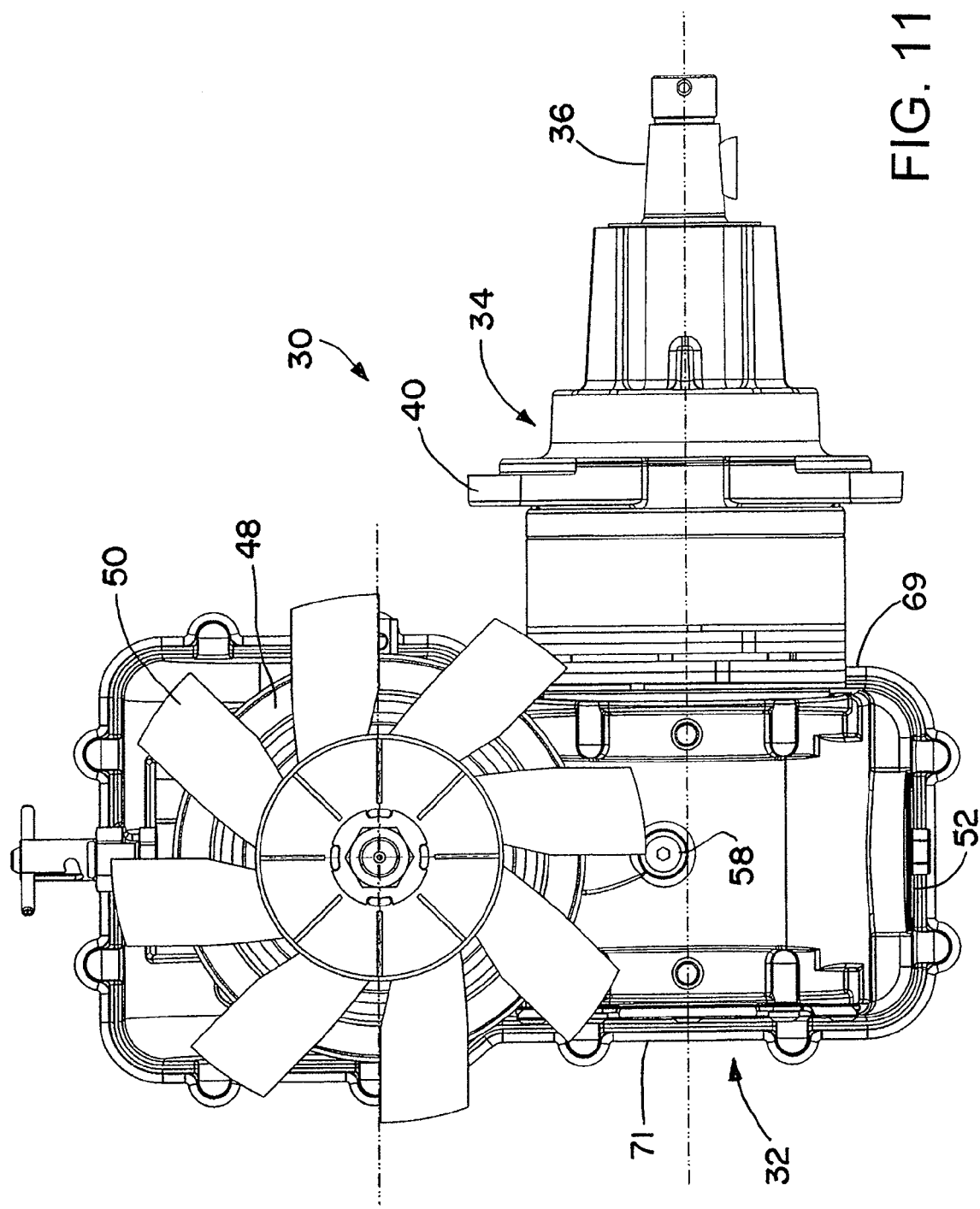
FIG. 11 is a top view of the hydrostatic transmission of FIG. 2 showing a right-hand transmission assembly.
Figure 12:
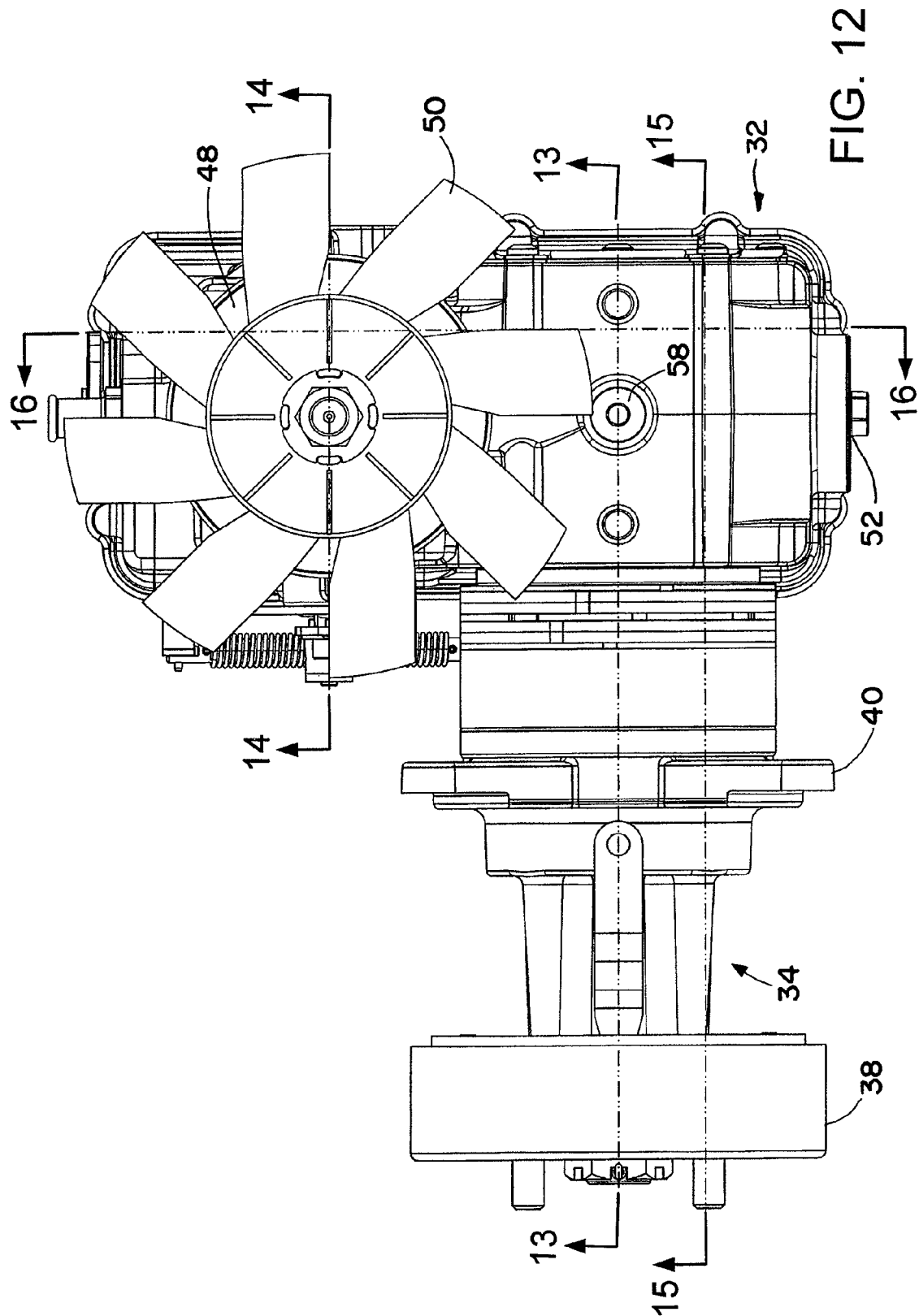
FIG. 12 is a top view of the hydrostatic transmission of FIG. 2 showing a left-hand transmission assembly.
Figure 15:
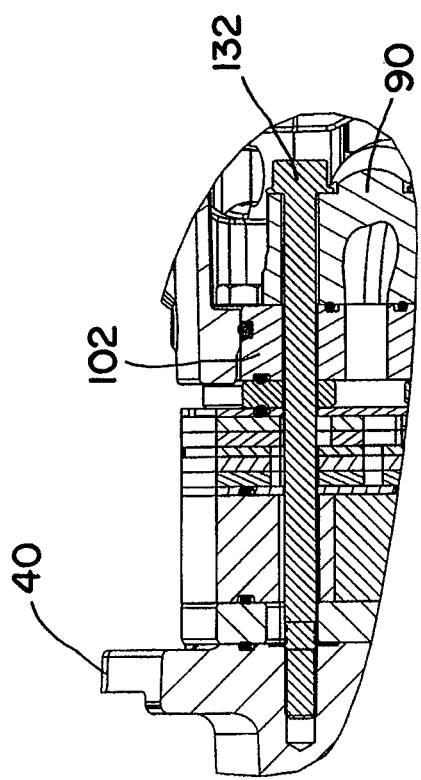
FIG. 15 is a partial cross-sectional view of the transmission, taken along line 15-15 of FIG. 12.

The housing 32 is generally symmetrical. It is noted, in particular, that the housing is provided with generally symmetrically arranged openings 66 and 67 (FIG. 13) that are essentially identical and oppositely facing in opposing walls 69 and 71 (FIG. 11). Depending on whether the transmission is to be used on the left or right-hand side of the mower, the openings can be machined differently after the housing is cast, i.e. by boring out the side where the motor module will be installed. Alternatively, both openings 66 and 67 could be bored or otherwise machined in the same manner to provide a housing that can have the motor module assembled to either side and the other side closed by a cover 68. The openings 66 and 67 are bordered by mounting faces that are symmetrical with respect to a longitudinal vertical central plane of the housing, and each mounting face is provided with a like arrangement of fastener bores. As a result, the motor module can be mounted at either opening 66 or 67, depending on which side of the mower the transmission is being mounted. The motor module 34 is secured by fasteners 132 extending through a center block and into the motor (shown in FIG. 15), and the side cover 68 can be attached to the opposite opening by suitable fasteners 70 to close the opening. The side cover 68 allows for easy installation of the fasteners 132 that attach the center block to the motor module 34. Because the transmission is modular, i.e. a portion of the transmission, such as a pump module or motor module, may be replaced without replacement of the entire transmission, the design provides for ease of service of both the motor module 34 and the pump module 44, which reduces repair costs to the transmission.

Figure 14:
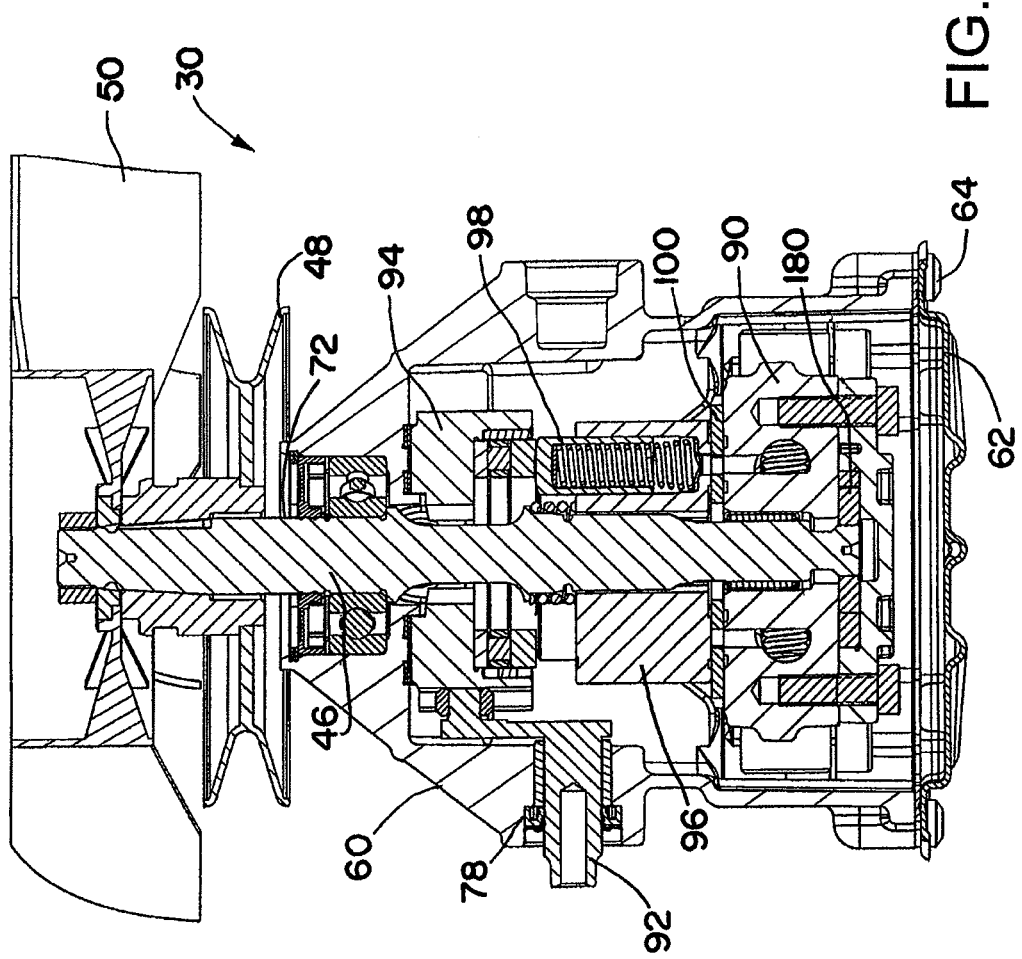
FIG. 14 is a cross-sectional view of the transmission, taken along line 14-14 of FIG. 12.

The top housing member 60 also includes a plurality of openings such as opening 72 (FIG. 14) for receiving the input shaft 46, an opening 74 (FIG. 18) for receiving a fitting 194 (FIG. 18), an opening 76 (FIG. 18) for receiving the filter 54, an opening 78 (FIG. 14) for the trunnion shaft, an opening 80 (FIG. 18) for the fill plug 58, and an opening 82 (FIG. 18) for a charge relief valve. Additionally, the bottom cover 62 can include an opening 84 (FIG. 18) for receiving a plug 86 that can be removed to drain the hydraulic fluid from the reservoir.

Figure 5:
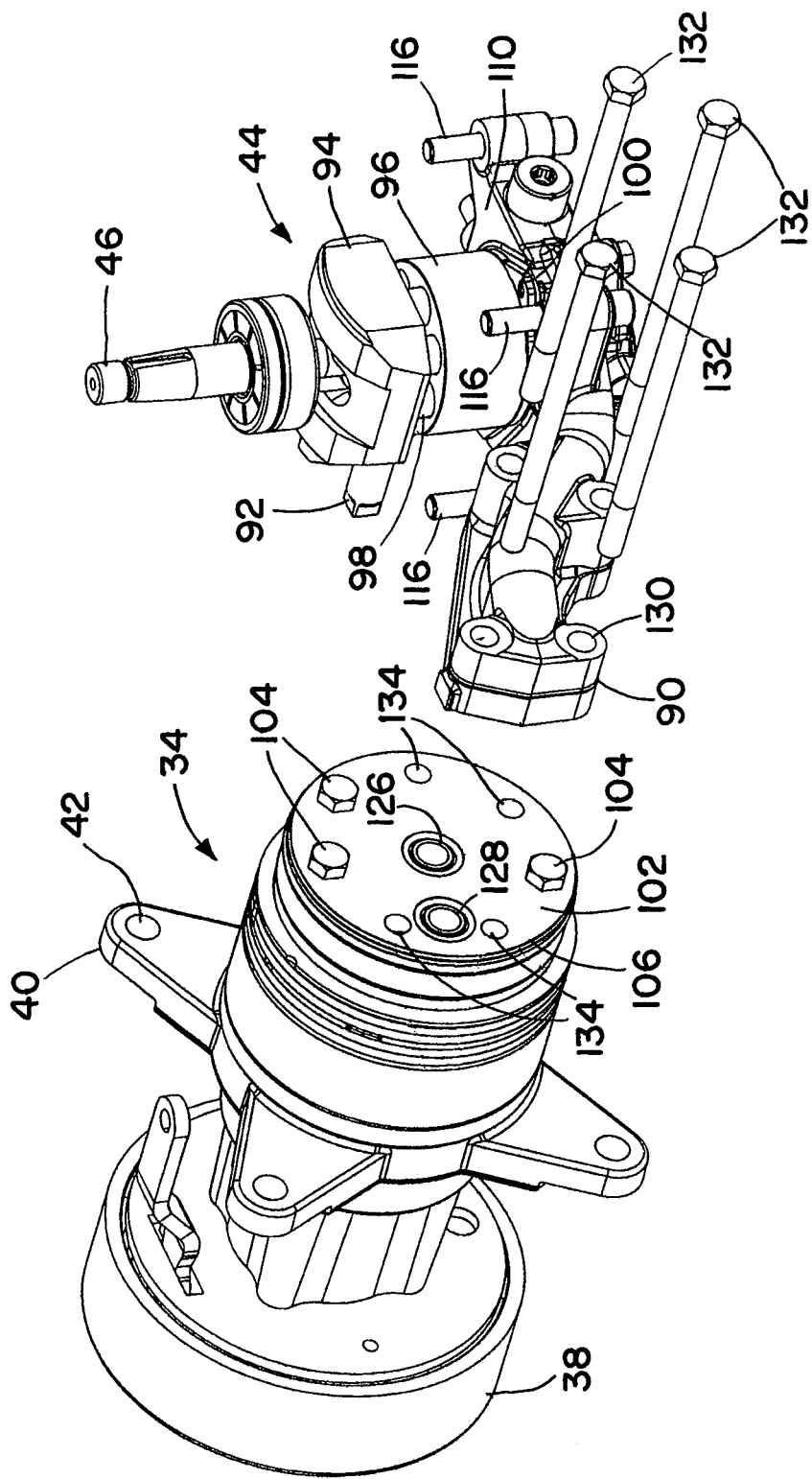
FIG. 5 is an exploded perspective view of the hydrostatic transmission, but with the reservoir housing removed to show a hydraulic pump module, a center block and the hydraulic motor module.
Figure 6:
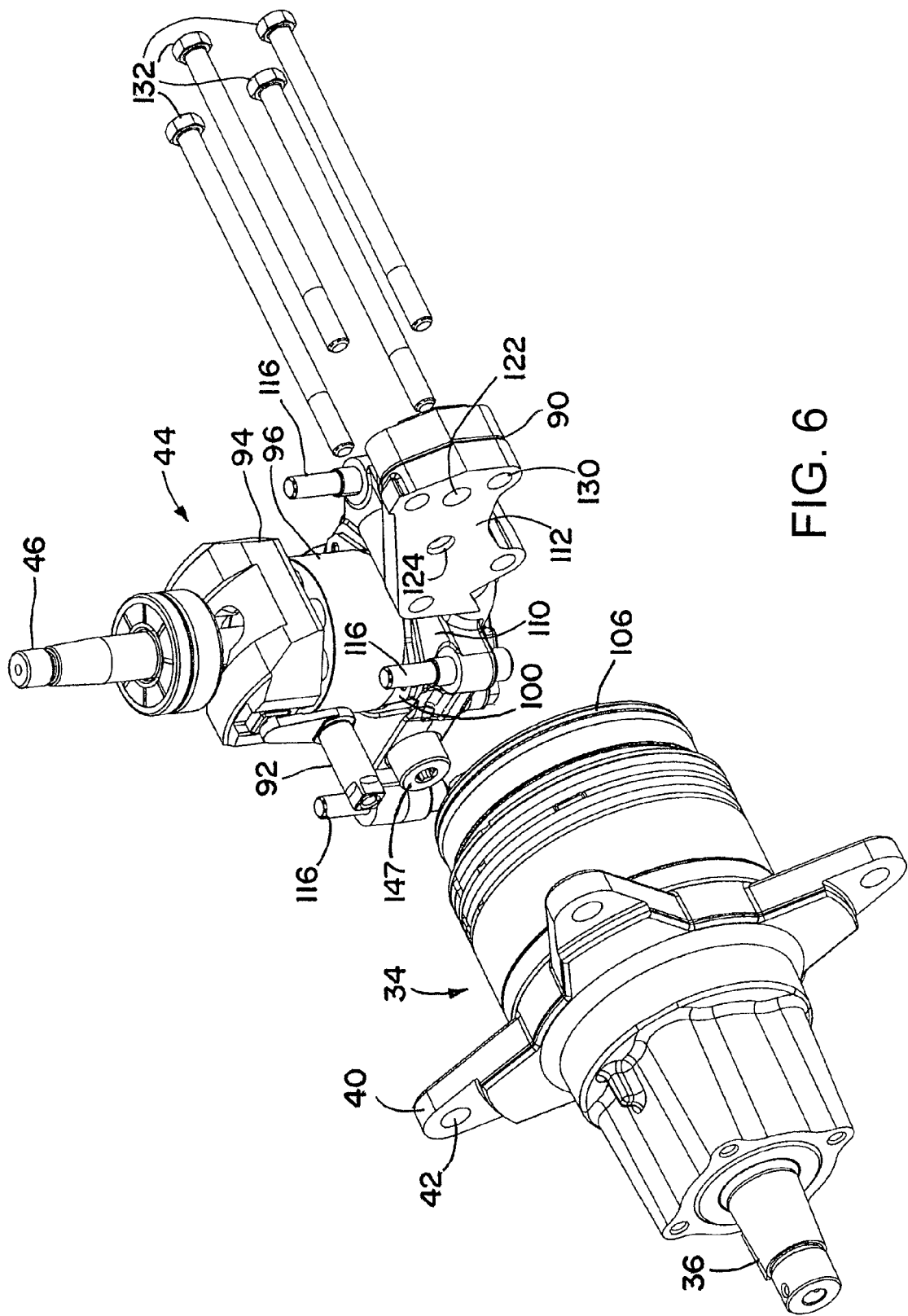
FIG. 6 is another perspective view of the hydraulic pump module, center block and the hydraulic motor module, but from a different angle.

Referring now to FIGS. 5 and 6, the motor module 34 and pump module 44 are shown, with the pump module shown adjacent to a center block 90 and the motor module shown uncoupled from the center block 90. As shown, the pump module 44 includes a trunnion shaft 92 to which a connecting member can be attached, the trunnion shaft 92 preferably being oriented ninety degrees to the output shaft 36 of the motor and extending from either the same or opposite side of the transmission as the motor module. Rotation of the trunnion shaft 92 will vary the displacement of the pump module, which is preferably a variable displacement piston pump including a swashplate 94, the angle of which is controlled by rotation of the trunnion shaft 92. The pump module 44 includes a rotatable barrel 96 with a plurality of reciprocating pistons 98, the barrel 96 rotating on a valve plate 100 that is supported on a horizontal surface of the center block 90.

The motor 35 has an end port plate 102 which is coupled to an output shaft housing 160 (FIG. 13) by suitable fasteners 104, such as bolts. The end port plate 102 includes inlet and outlet passages for communicating with ports of the center block 90, which will be described in greater detail below. The end port plate 102 has a radial seal groove 106 for receiving a suitable seal 108, such as an o-ring seal, that helps contain fluid in the cavity of the reservoir housing 32, and the reservoir housing 32 includes a bore that forms a mating surface for the seal 108.

Figure 8:
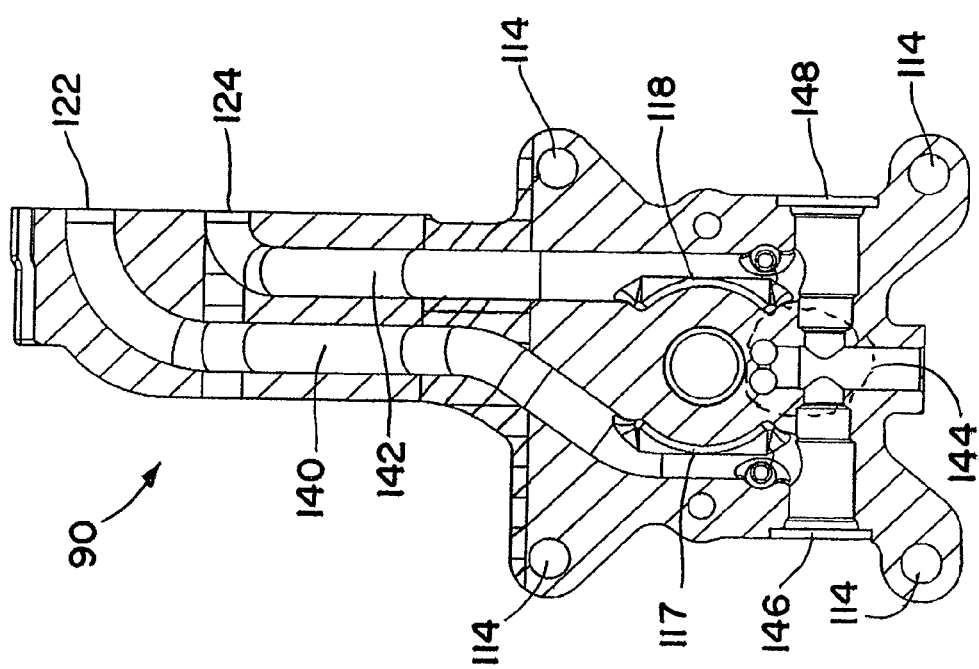
FIG. 8 is a cross-sectional view of the center block taken along the line 8-8 in FIG. 7.

The center block 90 includes a pump mount surface 110 and a motor mount surface 112. The pump mount surface 110 includes a plurality of holes 114 configured to receive fasteners 116, such as bolts, which extend upwardly through the holes 114 and into receiving holes in the reservoir housing 32 for attaching the center block 90 to the reservoir housing 32. The pump mount surface 110 additionally includes ports 117 and 118 (shown in FIGS. 8 and 10) for communicating with the pump module 44, which is secured in the reservoir housing by the center block. Similarly, the motor mount surface 112, which includes ports 122 and 124 for communicating with the ports 126 and 128 of the end port plate 102, includes holes 130 that receive suitable fasteners 132, such as bolts, to secure the center block 90 to the end port plate 102 via holes 134. The fasteners 132 also may assist in holding the various components of the motor together along with the fasteners 104 so as to accommodate higher pressures. The ports 117, 118, 122, 124 on the pump and motor mount surfaces 110 and 112 are located at opposite ends from, and oriented ninety degrees relative to the ports on the other surface. A suitable seal 136 may be provided between the center block 90 and the end port plate 102, and a groove for the seal may be located in either the center block or the end port plate.

As shown in FIGS. 7-10, connecting the ports 117, 118, 122, 124 are first and second fluid flow passages 140 and 142, the flow passages being configured to direct the hydraulic fluid between the pump and motor. A charge circuit 144 and two valve cavities 146 and 148 are provided, each of the valve cavities intersecting the charge circuit 144 and an associated one of the first and second fluid flow passages 140 and 142. Each valve cavity 146, 148 is adapted for receiving a valve 147, such as a check valve or a combination check/relief valve, for controlling fluid flow from the charge circuit 144 to the associated fluid flow passage. The check valves serve to provide makeup fluid to the fluid passages 140 and 142, the makeup fluid being provided by a charge pump or being pulled directly from the fluid reservoir. The center block 90 may also include a charge relief valve 150, which sets the maximum pressure in the charge circuit to a predetermined value. Excess fluid from the charge pump flows over the charge relief valve 150 and into the reservoir formed in the cavity of the reservoir housing 32.

Figure 7:
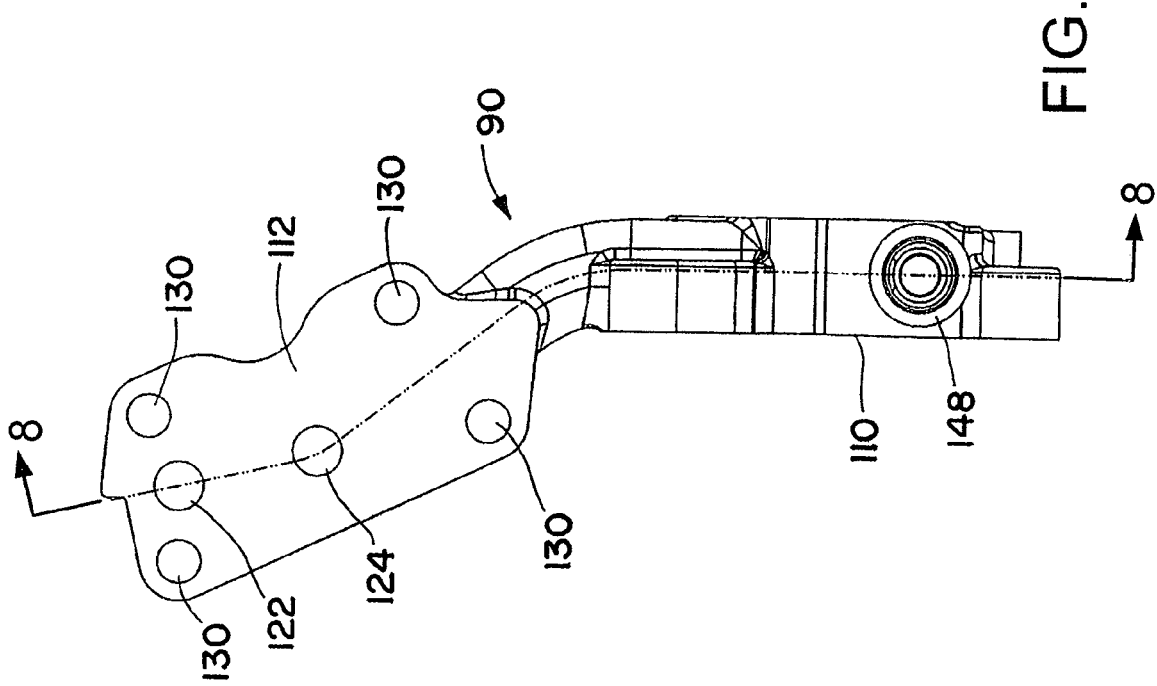
FIG. 7 is a side elevational view of the center block for left-handed mounting of the motor module.
Figures 9, 10:
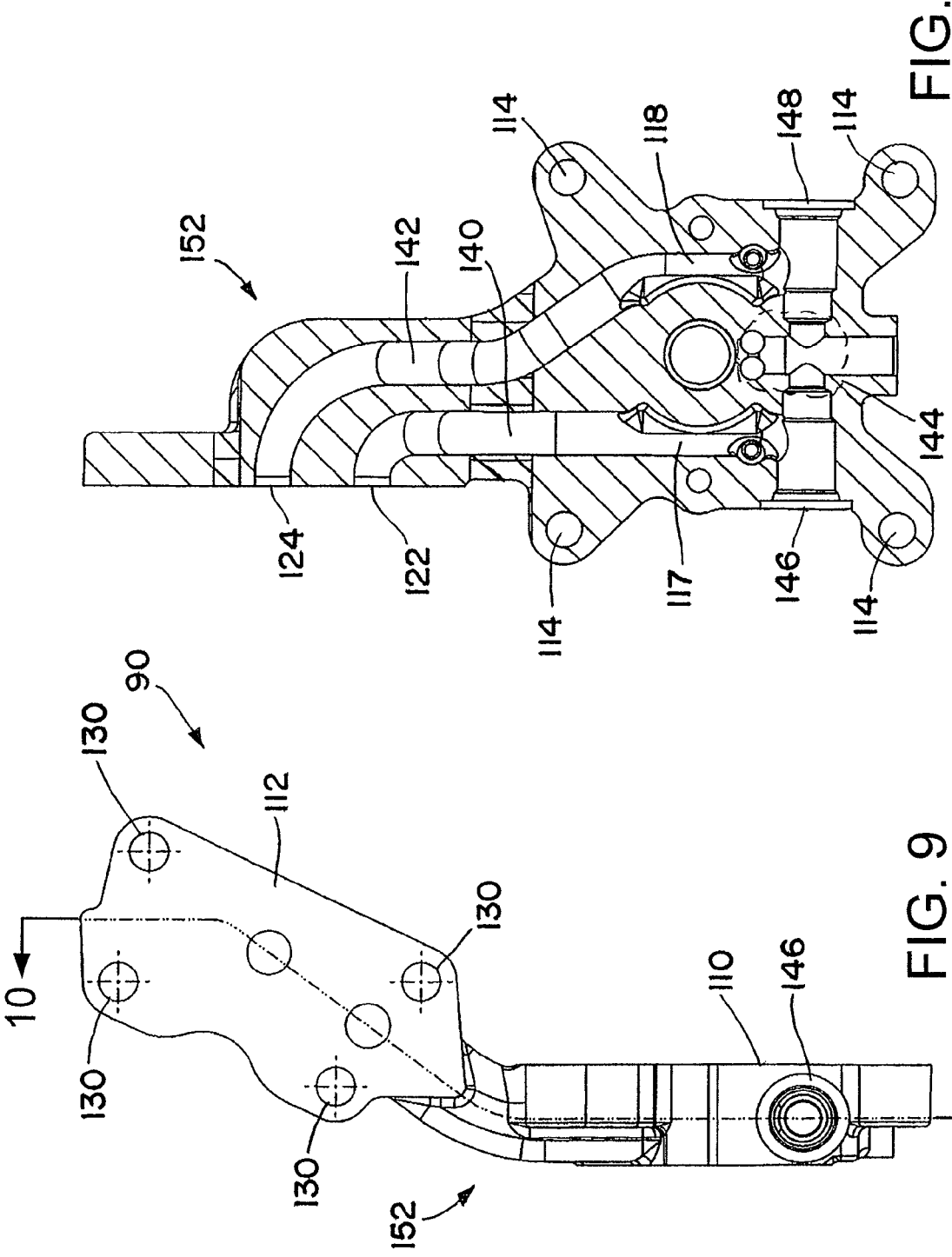
FIG. 9 is a side elevational view of the center block for right-handed mounting of the motor module.
FIG. 10 is a cross-sectional view of the center block of FIG. 9 taken along the line 10-10 in FIG. 9.

FIGS. 7 and 9 show center blocks 90 and 152, which are substantially the same, except center block 90 is for left-handed mounting of the motor module and center block 152 is for right-handed mounting of the motor module. In the center block shown in FIG. 7, the flow passage 140 is the high pressure conduit when operating the mower 10 in the forward direction and flow returns from the center of the motor to flow passage 142. In the center block shown in FIG. 9, the flow passage 140 is the high pressure conduit when operating the mower 10 in the forward direction and flow returns from the center of the motor to flow passage 142. As a result, in each center block, flow passage 142, which is connected to the center motor port, is only at high pressure when the transmission 30 is operated to move its associated wheel in a reverse direction.

Figure 13:
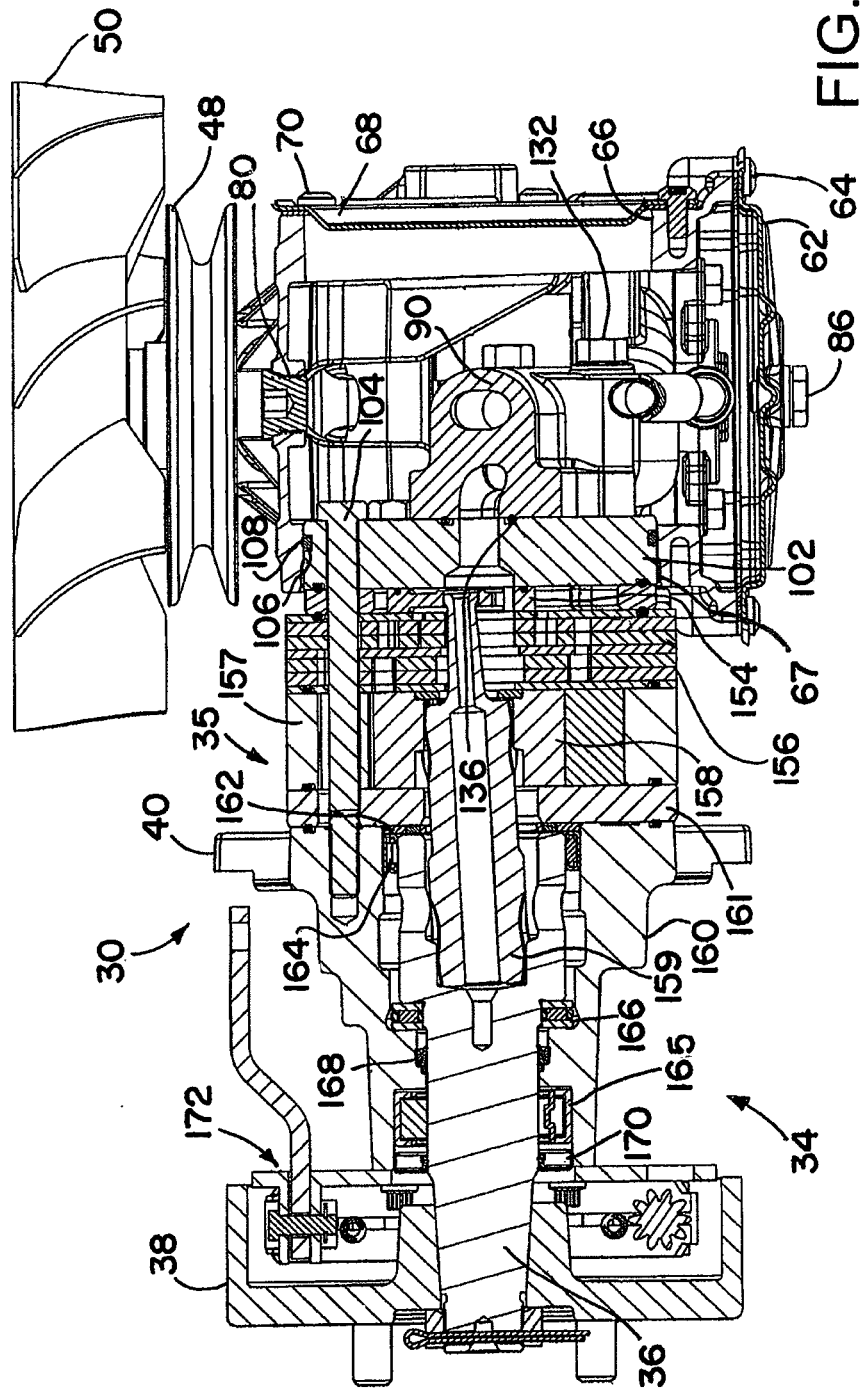
FIG. 13 is a cross-sectional view of the transmission, taken along line 13-13 of FIG. 12.

Referring now to FIGS. 11-14, and as best shown in FIG. 13, the hydraulic motor 35, which may be a gerotor motor, such as a two zone gerotor type low speed, high torque motor, for example a TG gerotor type motor available from the Parker Hannifin Corporation, however other motors may be used such as axial piston motors, radial piston motors, gear motors, vane motors, etc. The motor 35 has a commutator 154 communicating with the end port plate 102 that controls fluid flow into and out of manifold plates 156, which are brazed together, a stator 157, a rotor 158 splined to a drive link 159 coupled to the output shaft 36, a wear plate 161 abutting the rotor, and an output shaft housing 160. The various components are sealed by suitable seals, such as o-rings.

The output shaft 36 can serve as an axle shaft and is shown coupled to a wheel hub 38. The output shaft extends through a bore and is rotatably supported by suitable bearings, such as thrust bearings 162 and 166 and radial bearings 164 and 165, and is sealed by suitable shaft seals 168 and 170. The wheel hub 38 is coupled to a brake assembly 172, wherein the hub and brake assembly can be any conventional hub and brake assembly.

Accordingly, the various components of the motor module 34 are stacked together, outer edges of which form the exterior surface of the motor. The illustrated motor module eliminates the need for an outer enclosure, thereby reducing the weight of the overall transmission. The motor module 34 is assembled and is fully operational prior to being assembled into the transmission 30. This enables, for example, independent testing of the motor module 34 prior to assembly into the transmission 30.

Depending on the application, different motor displacements may be utilized to provide the required wheel torque. To this end, the motor rotor/stator assembly length can be changed in proportion to the displacement. To accommodate various motor displacements and maintain the same installation dimensions, the end port plate length may be varied in inverse proportion to the motor stator length. Thus, for higher displacement motors, a shorter length end port plate may be used to maintain the overall dimensions of the transmissions while providing increased displacement.

The motor may or may not include a drain conduit. If the motor does not have a drain conduit, the leakage from the high pressure side of the motor is communicated to a return, or low pressure side, of the motor. This is referred to as a 2-zone motor. To achieve pressurization of a motor shaft seal in a reverse direction, the porting within the center block 90 connects a reverse port of the pump module to port 124, which is the center motor port of the center block 90, which is connected to a center region of the motor.

Figure 17:
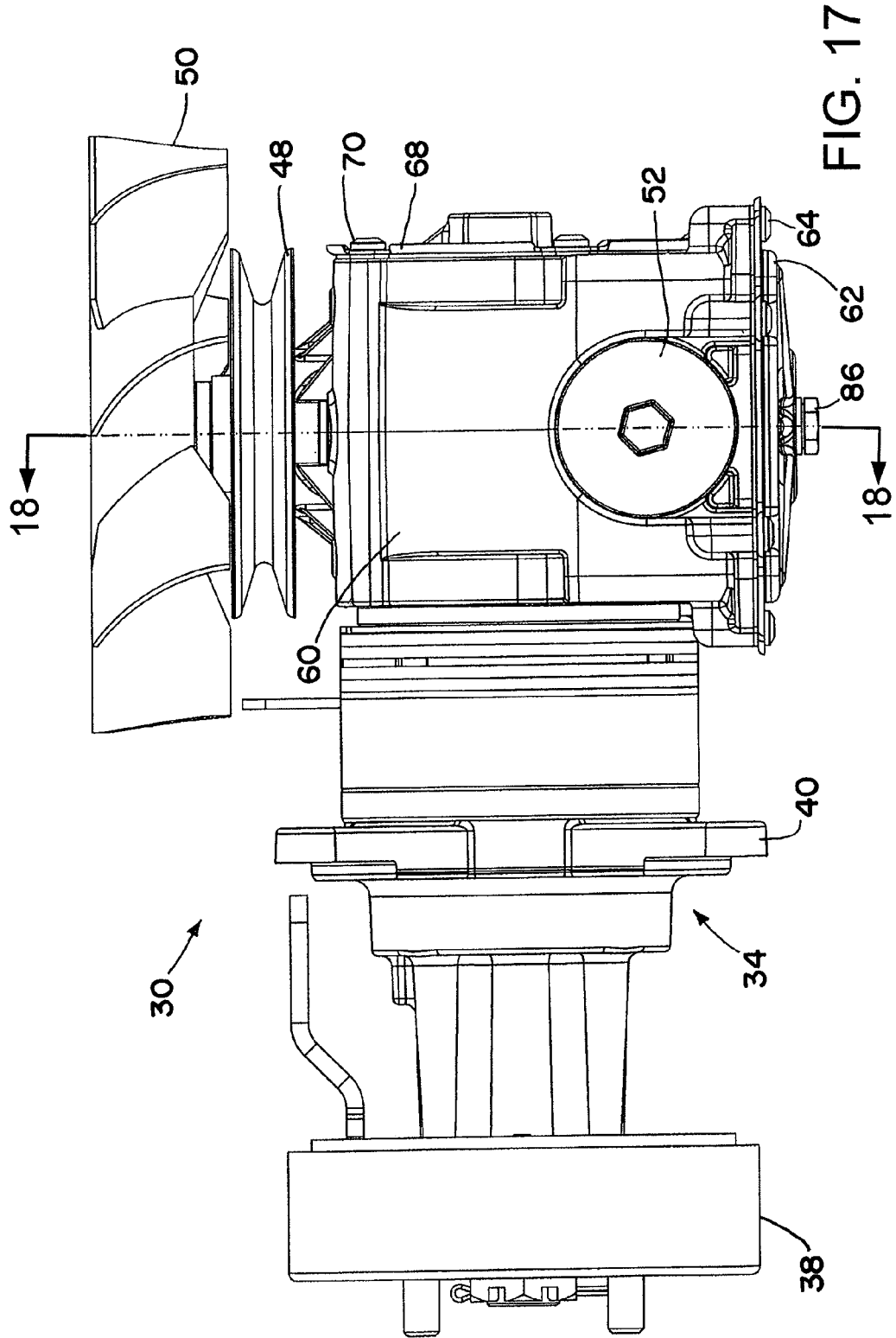
FIG. 17 is an end view of the hydrostatic transmission showing a left-handed transmission assembly.
Figure 18:
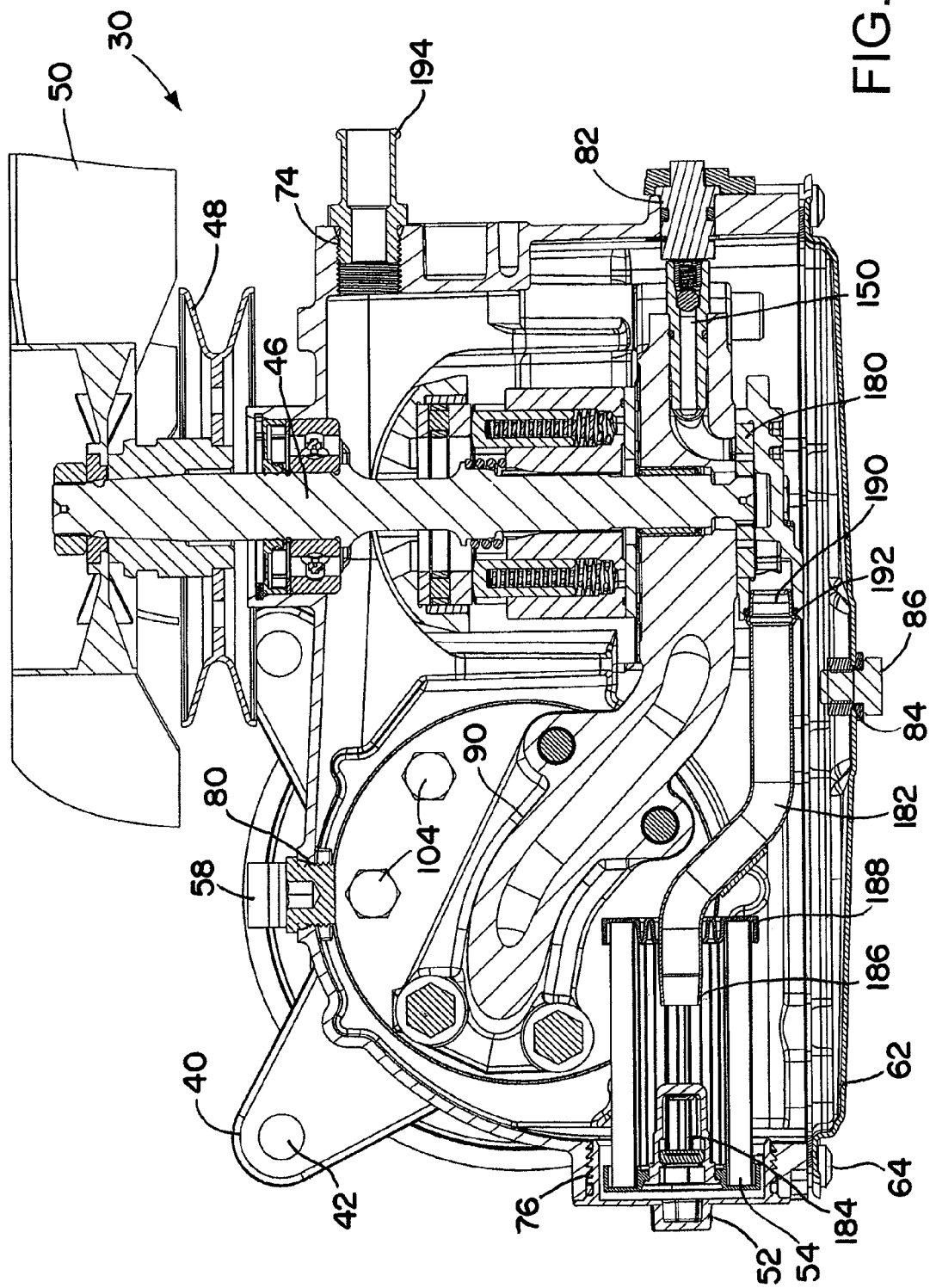
FIG. 18 is a cross-sectional view of the transmission, taken along line 18-18 in FIG. 17.

Referring now to FIGS. 17 and 18, the charge pump 180 and filter 54 are described in more detail. As shown, the charge pump is located below the center block 90, i.e. on the opposite side of the center block 90 as the pump module 44. The charge pump 180 may be any suitable charge pump, such as an internal gear type pump that is driven by the input shaft 46 of the pump module 44. The charge pump 180 is configured to pull fluid from the reservoir and through a tube 182 coupled to the filter 54, and acts to pump the fluid into the main hydraulic loop between the pump module 44 and the motor module 34.

The aforementioned filter 54 is located in an end wall of the transmission 30 opposite the pump module 44 thereby allowing for ease of service of the filter. The filter 54 may be threaded or otherwise installed in the reservoir housing 32 and held in place by the filter cap 52. The filter allows clean, filtered fluid to be pulled from the reservoir into the charge pump 180, and because the filter 54 is located at an opposite end of the reservoir housing 32 from the pump module 44, the coolest fluid in the reservoir is pulled into the charge circuit 144. The filter 54 may include a bypass valve 184, which prevents cavitation of the charge pump 180 during cold starts.

Figure 16:
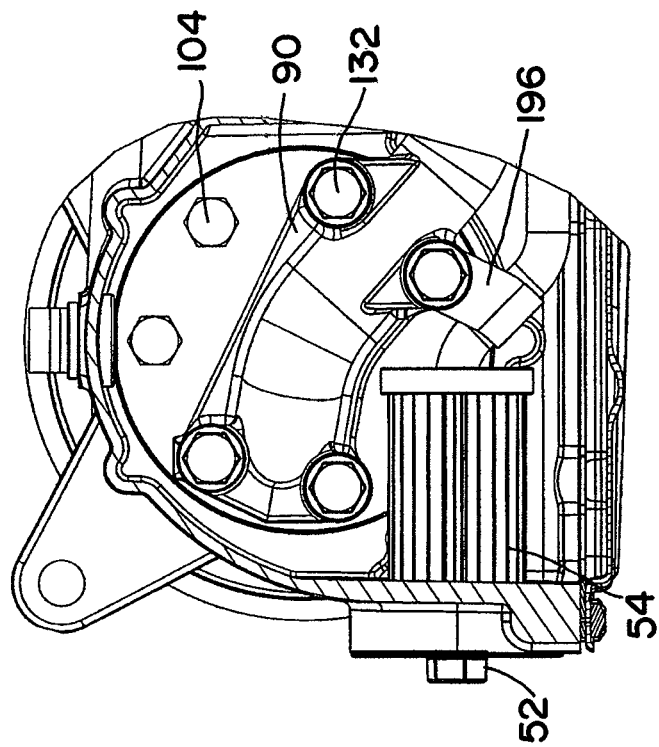
FIG. 16 is a partial cross-sectional view of the transmission, taken along line 16-16 of FIG. 12.

The filter 54 is coupled to a first end 186 of the filter tube 182 and sealed by a suitable seal 188, and the charge pump 180 is coupled to a second end 190 of the filter tube and sealed by a suitable seal 192. The filter tube 182 may be supported by one of the fasteners 132 used to connect the center block 90 to the motor module 34 via bracket 196, as shown in FIG. 16. To simplify installation of the filter 54, the filter can be attached to the filter cap 52 so that the filter can articulate about two axes. The degrees of freedom compensate for manufacturing tolerances which cause some amount of eccentricity between the filter tube 182 and a filter bore in the reservoir housing.

To allow for thermal expansion of the fluid within the reservoir, the transmission 30 can be connected to an expansion reservoir by fitting 194. The expansion reservoir may be mounted remotely on the mower 10, for example, beneath the operator's seat 16, to provide for easy checking of fluid level, and to simplify adding fluid to the transmission reservoirs during service. The remote expansion reservoir may be shared by both right and left side transmissions. If a remote expansion reservoir is not desired, an expansion reservoir may be attached directly to the reservoir housing via the opening 74.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An integrated hydrostatic transmission including:
   a hydraulic pump module;
   a reservoir housing forming interiorly thereof a reservoir chamber for containing hydraulic fluid and a wall including at least one opening communicating interiorly with the reservoir chamber;
   a hydraulic motor module extending through the opening to close the opening and having an end port plate having inlet and outlet passages and one or more plates through which fluid flows from/to the inlet/outlet passages; and
   a center block mounted to the housing and having a motor mount surface located in the reservoir chamber having at least one port for communicating with the inlet and outlet passages in the end port plate and a pump mount surface located in the reservoir chamber having at least one port for communicating with the pump module; and
   at least one fastener extending through the center block, the end port plate and the one or more plates to secure the motor module relative to the housing.

2. An integrated hydrostatic transmission according to claim 1, wherein the hydraulic motor module is pre-assembled.

3. An integrated hydrostatic transmission according to claim 1, wherein the reservoir housing includes at least two openings, and wherein the motor module is configured to be received in one of the openings for closing the opening, and a cover is configured to be attached to the other opening for closing the opening.

4. An integrated hydrostatic transmission according to claim 1, wherein the motor mount surface is located at an opposite end from and oriented ninety degrees relative to the pump mount surface.

5. An integrated hydrostatic transmission according to claim 1, wherein the motor mount surface is coupled to the end port plate by fasteners and wherein the pump mount surface is coupled to the reservoir housing by fasteners.

6. An integrated hydrostatic transmission according to claim 1, wherein the center block includes conduits that connect the at least one port for communicating with the pump module to at least one port for communicating with the end port plate to provide fluid flow between the pump module and the motor module.

7. An integrated hydrostatic transmission according to claim 1, wherein the center block includes valve cavities that each include a valve configured to provide makeup fluid to the conduits.

8. An integrated hydrostatic transmission according to claim 1, wherein the motor module includes lugs for attaching the transmission to a frame of a vehicle, the lugs being configured to support the entire transmission.

9. An integrated hydrostatic transmission according to claim 1, wherein a displacement of the motor module is configured to be changed without altering dimensions of the transmission by decreasing a length of the end port plate of the motor module inversely with increases in motor displacement.

10. An integrated hydrostatic transmission according to claim 1, wherein a radial seal seals between the reservoir housing and the end port plate.

11. An integrated hydrostatic transmission according to claim 1, wherein the motor module has a two zone gerotor type low speed, high torque motor, the conduits being connected to the motor such that a higher pressure conduit during rotation of an output shaft of the motor for moving in a forward direction of travel, when mounted to a vehicle, provides fluid to a port associated with an outside of the motor and flow returns to a lower pressure conduit through a center of the motor.

12. An integrated hydrostatic transmission according to claim 1, further comprising a filter configured to be installed into a rear portion of the housing.

13. An integrated hydrostatic transmission according to claim 12, wherein the filter includes a bypass valve configured to prevent cavitation of a charge pump.

14. An integrated hydrostatic transmission according to claim 12, further comprising a filter cap configured to secure the filter into the rear portion of the housing.

15. An integrated hydrostatic transmission according to claim 12, wherein the filter is located on an opposite end of the transmission from the pump module to allow only the lowest temperature fluid to be pulled into a charge circuit in the center block.

16. An integrated hydrostatic transmission including:
 a hydraulic pump module;
 a pre-assembled hydraulic motor module including an end port plate having inlet and outlet passages; and
 a reservoir housing having a chamber for receiving the hydraulic pump and forming a fluid reservoir, the reservoir housing having in a first side wall a first opening and in a second side wall opposite the first side wall a second opening, wherein the pre-assembled motor module is inserted in one of the first or second opening for closing the opening, and a cover is attached to the other of the first or second opening for closing the opening.

17. An integrated hydrostatic transmission according to claim 16, further including a center block mounted to the reservoir housing, the center block having a pump mount surface including at least one port for communicating with the pump and a motor mount surface including at least one port for communicating with the end port plate.

18. An integrated hydrostatic transmission according to claim 16, wherein the pre-assembled hydraulic motor module includes a plurality of stacked components, outer edges of which form an exterior surface of the hydraulic motor.

19. An integrated hydrostatic transmission including:
 a hydraulic pump module;
 a reservoir housing having a chamber for receiving the hydraulic pump module and forming a fluid reservoir, the reservoir housing including in opposing walls at least one opening in each wall;
 a hydraulic motor module including an end port plate having inlet and outlet passages, one or more plates through which fluid flows to/from the end port plate, a stator, a rotor, an output shaft, a drive link coupled to the output shaft, and an output shaft housing, wherein the one or more plates, the stator, and the output shaft housing are stacked together such that outer edges thereof form an exterior surface of the motor module that extends outside the reservoir housing; and
 a cover,
 wherein the motor is received in one of the openings for closing the opening, and the cover is attached to the other opening for closing the opening.

20. An integrated hydrostatic transmission according to claim 19, further including a center block mounted to the housing, the center block having a pump mount surface including at least one port for communicating with the pump and a motor mount surface including at least one port for communicating with the end port plate.

21. A method of assembling an integrated hydrostatic transmission, the method comprising:
 mounting a hydraulic pump module to the underside of a top housing member that forms with a bottom housing member a reservoir housing having opposed side walls with respective first and second openings therethrough;
 mounting a center block with respect to the hydraulic pump so that a pump mount surface on the center block is adjacent a bottom of the pump module for communicating inlet/outlet ports of the pump module to respective flow passages in the center block;
 inserting a pre-assembled motor module into one of the first or second openings;
 mounting the center block to the motor module at a motor mount surface of the center block for communicating outlet/inlet ports of the motor module with respective flow passages in the center block; and
 closing the other of the first or second openings in the reservoir housing via a cover.

22. A method accordingly the claim 21, wherein the first and second openings are formed in the top housing member that is configurable to left-handed or right-handed motor mounting by machining a corresponding opening to receive the motor module.

23. A method according to claim 21, wherein the motor module is inserted into the first opening and the cover closes the second opening for a right-handed transmission and the motor module is inserted into the second opening and the cover closes the first opening for a left-handed transmission.

* * * * *